Patented July 22, 1941

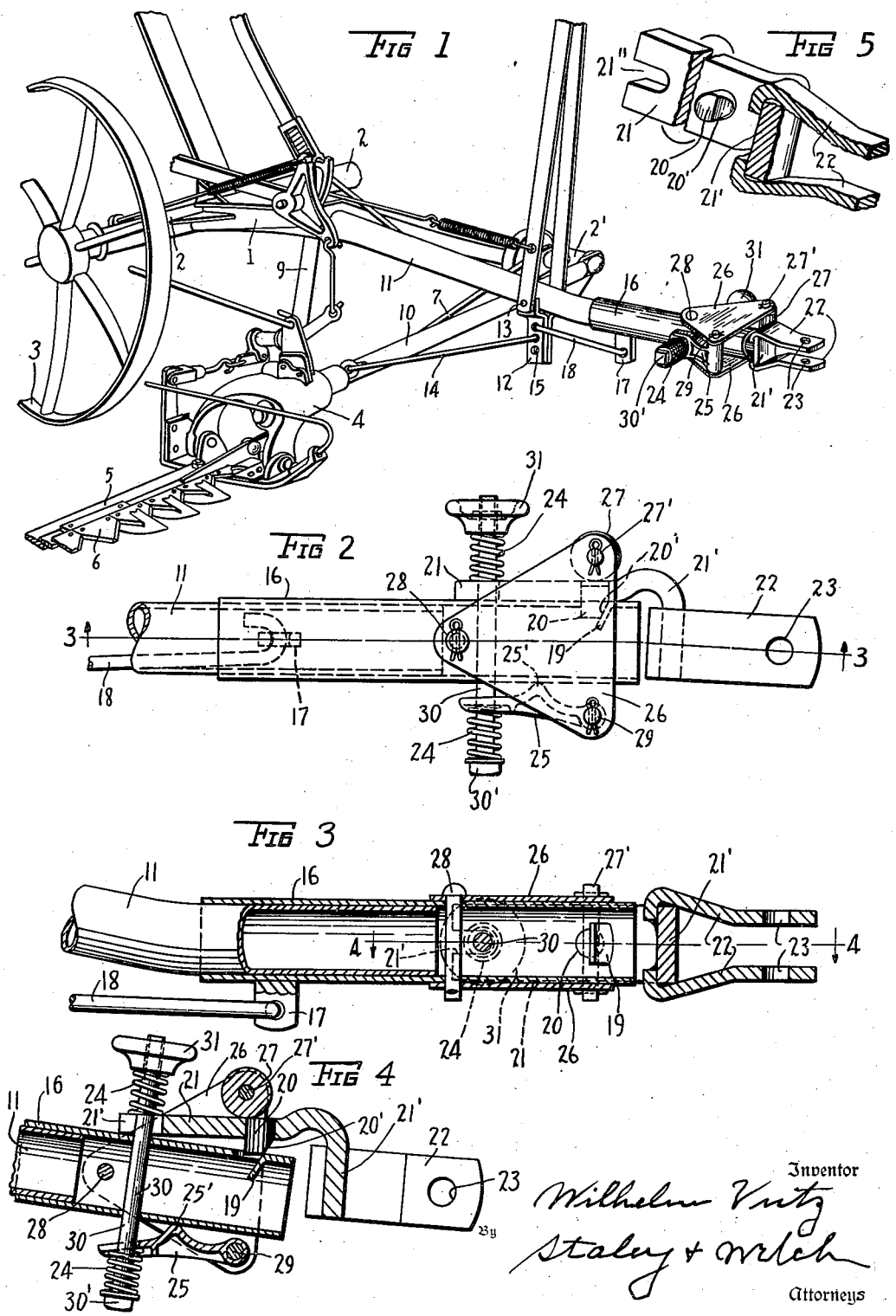

2,250,317

UNITED STATES PATENT OFFICE 2,250,317

HITCH DEVICE FOR AGRICULTURAL IMPLEMENTS

Wilhelm Vutz, Coldwater, Ohio, assignor to New Idea, Inc., Coldwater, Ohio, a corporation of Ohio Application January 26, 1940, Serial No. 315,810

7 Claims. (Cl. 280—33.16)

This invention relates to hitching devices for mowers for hitching the mower to a tractor and relates more particularly to hitching devices which will automatically permit the uncoupling of the mower from the tractor under overload due to strain of side draft in the mower or by a straight forward pull or by a combination of both side draft and forward pull.

It has been common to provide an overload release in hitching devices between a mower and a tractor which will automatically uncouple the mower from the tractor under the strain of overload, this releasing action being controlled solely by the amount of straight forward pull in the hitch, side draft in the mower resulting from an offcenter position of the cutter bar having no influence on the release action. While a release effected by a straight forward pull is effective when a short cutter bar is used in the mowing machine, the automatic release cannot be depended upon to always release under overload when a longer cutter bar is employed in the mowing machine. In a mowing machine employing a long cutter bar the distance between the point where the clevis is attached to the mower and the outer end of the cutter bar is equal to or exceeds the distance between the point where the clevis is attached to the mower and the axle of the carrying wheels of the mower, as a result of which, when the cutter bar hits an obstruction near the outer end, side draft reaction in the stub tongue will increase faster than forward pull in the hitch, and the mower will consequently tend to skid sidewise. In the event of such a happening the side pull applied to the hitch is great enough to make the hitching devices bind and become unreliable in operation.

It is an object of this invention to provide for controlling the releasing devices by the skidding action of the mowing machine due to the strain of side draft upon the cutter bar when the cutter bar meets an obstruction.

A further object of the invention is to also incorporate in the hitching devices means for releasing the devices under undue strain when a straight forward pull is being exerted upon the mowing machine from the tractor.

In the accompanying drawing:

Fig. 1 is a perspective view of a portion of a mowing machine to which the improvements have been applied.

Fig. 2 is a top plan view of the hitch devices and a portion of the mower pole.

Fig. 3 is a longitudinal section on the line 3—3 of Fig. 2.

Fig. 4 is a transverse section on the line 4—4 of Fig. 3, with the parts in a different position from that shown in Fig. 2.

Fig. 5 is a perspective view partly in section and partly in elevation and partly broken away of the clevis forming a part of the hitching device.

Referring to the drawing, 1 represents a portion of the frame of a mowing machine having the usual axle extensions 2 upon the ends of which are journalled carrying wheels, a part of one of which is shown at 3. The inner cutter bar shoe is indicated at 4 and carries in the usual way the cutter bar 5 and reciprocating cutter 6 which is reciprocated in the usual way by the pitman rod 7. This shoe is secured to the main frame of the mower in the usual way by an auxiliary A-frame 9 and 10, the member 9 being secured to the frame 1 and the member 10 secured to an extension 2' of the main frame which carries the mechanism which reciprocates the rod 7. The main frame 1 has the usual forwardly extending stub pole 11. In the present case the draft is applied to the frame of the machine through the stub pole 11 and also to the cutter bar shoe 4 by an equalizer 12 which is shown as of Y-shape pivotally connected to the pole 11 by a bolt 13 and to the frame member 10 at a point near the shoe 4 by a rod 14, this rod being pivoted to the equalizer 12 through any one of a series of openings 15 to secure the proper proportionate draft.

Slidably mounted upon the outer end of the stub pole 11, which is preferably of tubular form, is a sleeve 16 which has on the under side thereof an ear 17 which is pivotally connected with the equalizer 12 by a rod 18. Struck from the metal of that side of the sleeve farthest removed from the cutter bar is an inwardly extending rearwardly inclined lip 19 with which cooperates the beveled face 20' of a stud 20 which is carried by the flat memer 21 of the clevis, this flat member being adapted to lie along that side of the sleeve having the lip and having its forward end bent at right angles as shown at 21' and rigidly secured to the clevis members 22 which have perforations 23 to receive the bolt which pivotally secures them to the frame of the tractor. The stud is adapted to project into the perforation left by the lip and the stud and lip are held in operative engagement, as shown in Fig. 2, by springs 24, which through the bridge 25, triangular plates 26 and roller 27 exert a pressure upon the member 21 of the clevis. The rear angled portion of each of the triangular plates 26 is pivotally connected to the sleeve 16 by the pin 28. The forward end of the spring bridge 25 is hinged on trunnions 29 projecting from the plates 26 at one of the forward angles thereof and has a fulcrum portion 25' in contact with the sleeve 16 so that the spring pressure applied to the free forked end of the spring bridge in the direction of the sleeve will tend to move the trunnions away from the sleeve and thereby swing the plates 26 on the pivot pin 28 and cause the roller 27 to bear upon the part 21 and maintain the stud 20 and lip 19 in engagement, as shown in Fig. 2; the roller 27 being journalled upon a pin 27' carried by the plates 26 at one of the forward angles thereof and the pin 28 being carried by the sleeve. The rear portion of the part 21 of the clevis is slotted as indicated at 21'' to permit the passage of the spring bolt 30 therethrough, this spring bolt also passing through aligned apertures in the sleeve 16, one of the springs 24 being interposed between the clevis part 21 and the adjusting nut 31 on the bolt and the other spring 24 being interposed between the forked end of the spring bridge 25 and the head 30' of the bolt.

In operation, in the event of the cutter bar striking an obstruction, particularly near its outer end, the machine, including its pole 11, will of course be swung at an angle to the direct line of travel which swings the sleeve 16 carried by the pole at an angle to the clevis as shown in Fig. 4. This causes a separation of the stud 20 and lip 19 as shown in that figure which releases the clevis from the sleeve and detaches the machine from the tractor.

In addition to releasing the hitching devices by a swinging movement of the machine due to the cutter bar meeting with an obstruction, the hitch device may also be detached by a straight forward pull in the event that an obstruction is met with by the inner shoe 4 or by any other part near the center of the mower such as the frame or the wheels. Such a release is permitted by the cooperation of the bevel face on the stud 20 and the inclination of the lip 19 which by a camming action acts to separate the stud and lip against the tension of the springs.

While the hitch devices have been shown in connection with a mowing machine, it should be understood that these devices might be successfully employed in connection with other tractor-drawn machines or vehicles.

Having thus described my invention, I claim:

1. In an overload release for mower which has a laterally extending cutter bar and a draft pole, a sleeve slidably mounted on said pole and connected therewith, a clevis, an inwardly extending lip on one side of said sleeve, a stud on said clevis adapted to project through an aperture in said sleeve adjacent the lip, and spring means for holding said stud in said aperture in engagement with said lip when the pole and clevis are aligned, said spring means being yieldable to permit the disengagement of said stud and lip when said pole and clevis are thrown at an angle to each other due to the strain of an obstruction upon said cutter bar.

2. In an overload release for a drawn implement which has a forwardly extending pole, of a sleeve slidably mounted on said pole and connected therewith, a clevis having an extension located at one side of said sleeve, a stud having an inclined face carried by said extension, an inclined inwardly extending lip formed on said sleeve, said sleeve having an aperture adjacent said lip to receive said stud to permit the inclined face thereof to engage said inclined lip, and spring means to hold said stud and lip engaged during the normal travel of the machine and yieldable to permit the disengagement of said stud and lip when the sleeve is thrown at an angle to said clevis extension.

3. In an overload release for a drawn implement which has a forwardly extending pole, of a sleeve slidably mounted on said pole and connected therewith, a clevis having an extension located at one side of said sleeve, a stud having an inclined face carried by said extension, an inclined inwardly extending lip formed on said sleeve, said sleeve having an aperture adjacent said lip to receive said stud to permit the inclined face thereof to engage said inclined lip, a member pivotally connected with said sleeve, a roller carried by said member adapted to bear upon said clevis extension, a spring bridge fulcrumed on said sleeve and having one end thereof pivotally connected with said pivoted member, and a spring bearing upon the free end of said bridge.

4. In an overload release for a drawn implement which has a forwardly extending pole, a sleeve slidably mounted upon said pole and connected therewith, a clevis, coupling parts carried respectively by the clevis and sleeve, a member pivotally connected with said sleeve, a spring bridge fulcrumed on said sleeve and pivotally connected with said pivoted member, and a spring bearing upon the free end of said bridge to force said pivoted member against said clevis to hold said coupling parts in engagement but permitting the same to be disengaged by undue strain.

5. In an overload release for a drawn implement having a draft pole, a coupling member, an inclined lip associated with one side of said pole, a stud on said clevis having an inclined face, and spring means for holding the inclined face of said stud in engagement with said inclined lip when the pole and coupling member are aligned, said spring means being yieldable to permit the disengagement of said stud and lip when said pole and coupling member are thrown at an angle to each other due to the strain of an obstruction upon said implement.

6. In an overload release for a drawn implement which has a forwardly extending pole, a coupling member having a part thereof located at one side of said pole, a stud having an inclined face carried by said coupling member part, an inclined inwardly extending lip and an aperture adjacent said lip associated with said pole to permit the inclined face of said stud to engage said inclined lip, and spring means to hold said stud and lip engaged during the normal travel of the machine and yieldable to permit the disengagement of said stud and lip when the pole is thrown at an angle to said coupling member part.

7. In an overload release for a drawn implement which has a forwardly extending pole, a coupling member having an extension located at one said of said pole, a stud having an inclined face carried by said extension, an inclined lip and an aperture adjacent said lip associated with said pole, said aperture adapted to receive said stud to permit the inclined face thereof to engage said inclined lip, a pivoted member connected with said pole, a roller carried by said member adapted to bear upon said coupling member extension, a fulcrumed spring bridge having one end thereof pivotally connected with said pivoted member, and a spring carried by said pole bearing upon the free end of said bridge.

WILHELM VUTZ.